United States Patent Office 2,714,940
Patented Aug. 9, 1955

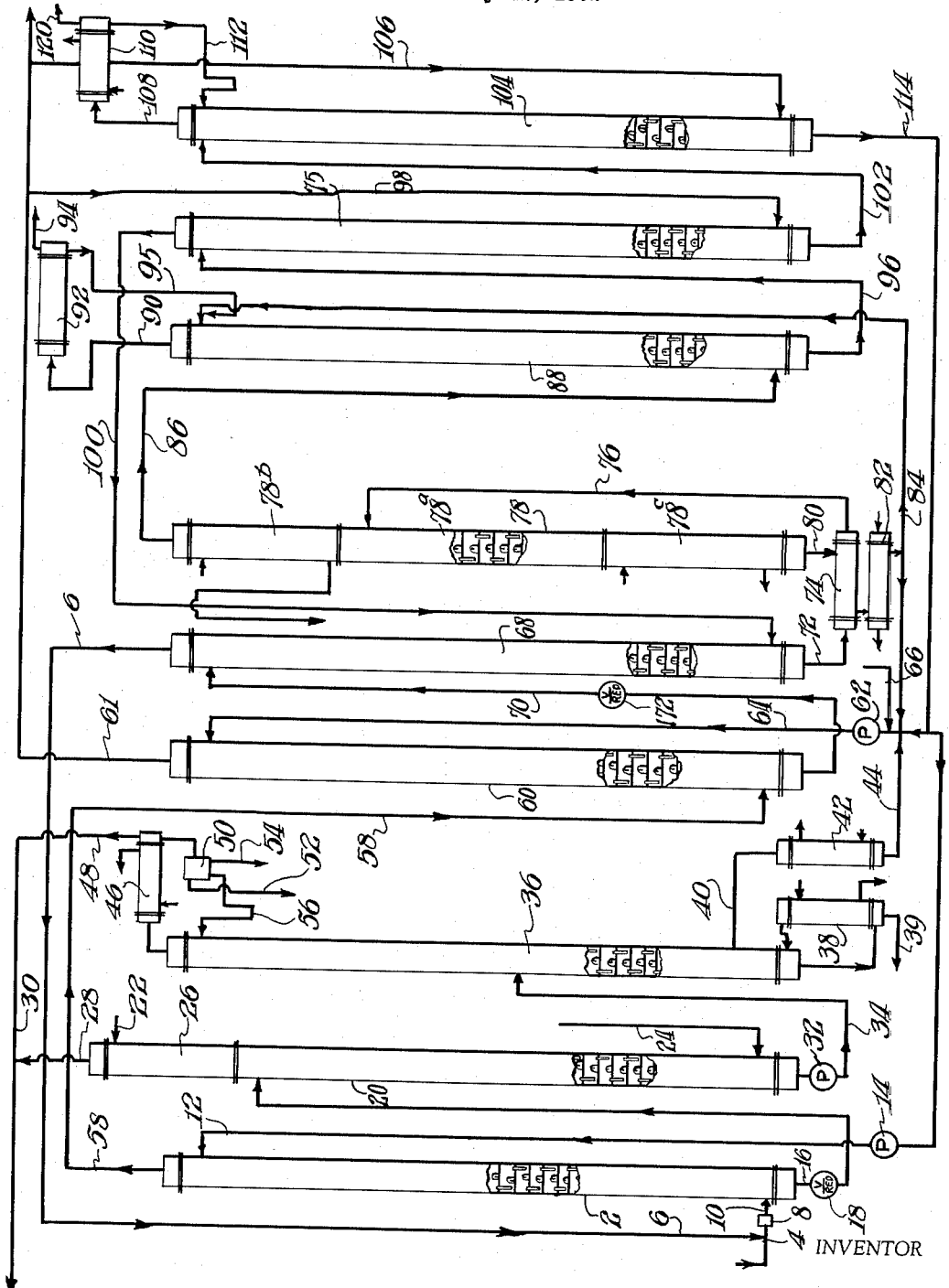

2,714,940

PURIFICATION OF ACETYLENES

Thomas J. Milligan, Wilmington, Del., assignor to E. I. du Pont de Nemours and Company, Wilmington, Del., a corporation of Delaware Application July 12, 1952, Serial No. 298,605

5 Claims. (Cl. 183—115)

This invention relates to a process for the purification of acetylene, particularly the purification of acetylene produced by the pyrolysis of hydrocarbons such as methane or natural gas.

Many efforts have been made in recent years to produce substantially pure acetylene from natural gas. Natural gas composed largely of methane has been subjected to highly elevated temperatures, for example, in an electric arc, partial combustion with oxygen in a special burner or intermittent application of heat in a regenerative, gas-fired furnace. The resulting crude gas from the pyrolysis step contains from about 2% to 14% of acetylene and a considerable number of difficultly removable impurities.

Such crude gases contain, for example, acetylene, hydrogen, diacetylene, methylacetylene, carbon monoxide, ethylene, methane, nitrogen, monovinylacetylene, divinylacetylene, and benzene. Although some of these crude gas constituents are present in relatively small percentages, it is essential that their presence be greatly reduced or eliminated.

It is an object of this invention to provide an efficient process for the separation of substantially pure acetylene from the crude gas resulting from the pyrolysis of hydrocarbons.

It is another object of this invention to provide an efficient process for the separation of substantially pure acetylene from the crude gas resulting from the pyrolysis of hydrocarbons by the use of a single solvent.

It is a further object of this invention to provide an improved system for the recovery of relatively pure acetylene from crude hydrocarbon pyrolysis gas by the selective absorption of the impurities in dimethylformamide.

Other objects of the invention will appear hereinafter.

These objects may be accomplished by the progressive separation of the gaseous components through repeated selective absorption in quantities of dimethylformamide and stripping the absorbed components therefrom. More specifically, the crude gas is passed through dimethylformamide to remove any diacetylene but very little acetylene from the gas, then the so purified gas is again passed through a much larger quantity of dimethylformamide to remove nearly all of the acetylene therefrom together with material quantities of ethylene and carbon dioxide, selectively stripping the ethylene and carbon dioxide from the second quantity of dimethylformamide without removing much acetylene, then stripping the acetylene from such second quantity of dimethylformamide and passing the acetylene with the remaining impurities, particularly methylacetylene, into a third quantity of dimethylformamide to remove the methylacetylene contained therein and withdrawing unabsorbed acetylene, as product, from the third quantity of dimethylformamide.

The details of the present invention can best be disclosed by reference to the accompanying diagrammatic flow-sheet.

In the flow-sheet, 2 designates a diacetylene absorber. Pipe-lines 4 and 6, respectively, feed crude hydrocarbon pyrolysis gas and recycle gas to a compressor 8 which is connected by pipe 10 to the lower end of the absorber 2. The mixed gas is compressed to a pressure such that the partial pressure of the acetylene in the gas does not exceed 2 to 3 atmospheres, and preferably not to exceed 1½ atmospheres. The pressure that may be imposed on the gas is limited by the dangerous explosiveness of acetylene under pressure. A small stream of dimethylformamide is pumped into the upper end of absorber 2, by means of pump 14 and pipe 12. This stream is, of course, pumped at the pressure to be maintained in the absorber. The quantity of dimethylformamide furnished to the absorber should be sufficient to remove nearly all of the diacetylene and water from the gas without removing any greater amount of acetylene therefrom than is necessary. The selective absorption of dimethylformamide is such that about 99% of the diacetylene and substantially all the water and any benzene contained in the gas can be absorbed without absorbing more than about 2% or 3% of the acetylene content.

The dimethylformamide, containing the absorbed diacetylene, water, and benzene, is continuously withdrawn through pipe 16 and pressure reducing valve 18, and is passed through pipe 16 into the diacetylene stripper 20 which is preferably operated at about atmospheric pressure. The diacetylene is stripped from the dimethylformamide in stripper 20 by counter-currently passing an inert gas through pipe 24 into the lower end of the stripper. Natural gas or other pyrolysis feed gas may be used for such stripping purposes. To avoid excessive loss of dimethylformamide, a water scrubber 26 is positioned on top of the stripper and a small stream of water is continuously passed into the scrubber through pipe 22. The water flows down through the stripper 20 with the dimethylformamide. The stripping gas containing diacetylene and water with small amounts of other constituents is removed through pipes 28 and 30 from the top of scrubber 26 and is either passed to waste or is added to the natural gas or other hydrocarbon furnished to the pyrolysis apparatus (not shown).

The dimethylformamide, containing some water and any benzene that may have been contained in the crude pyrolysis gas, is pumped by pump 32 through pipe 34 into the dimethylformamide-water still 36 for the separation of the dimethylformamide from the water and benzene. The dimethylformamide is boiled by steam-heated boiler 38. Any high-boiling components absorbed in the dimethylformamide, for example, high acetylene polymers and the azeotrope of dimethylformamide and formic acid, remain in the bottom of the still and may be removed periodically, as needed, by purging from the still through purge line 39. Substantially pure dimethylformamide vapor may be drawn off through pipe 40 which is connected to the still over the top of the third or fourth plate from the bottom of still 36. The dimethylformamide is condensed in cold water condenser 42 from which it is passed to the main stream of dimethylformamide through pipe 44. The water and benzene vapors pass from the top of still 36 into water condenser 46 from which any remaining gases are passed through pipe 48 to pipe 30. The condensed water and benzene are passed into decanter 50 from the top of which the benzene or other light fraction is withdrawn through pipe 52 and passed to waste. A portion of the condensed water is passed from the bottom of the decanter 50 through pipe 54 to waste and a portion may be refluxed through pipe 56 to the top of the still, as shown.

The gas passing upwardly through the diacetylene absorber 2 is withdrawn from the top of the absorber through pipe 58 and is led into the lower end of acetylene absorber 60. The main stream of dimethylformamide, approximately 30 to 70 times as great as the stream of dimethylformamide passing into diacetylene absorber 2 is pumped, at a pressure approximately the same as in absorber 2, into the upper end of absorber 60 by means of pump 62 and pipe 64. Additional dimethylformamide may be added to the system through pipe 66 from a supply source, not shown. Nearly all, over 95%, of the acetylene is absorbed in the main stream of dimethylformamide as it passes through absorber 60. This stream of dimethylformamide is passed from absorber 60 to a carbon dioxide and ethylene stripper 68 by means of pipe 70 and pressure reducing valve 172. The gas passing from the acetylene absorber 60 comprises mainly the hydrogen, methane, nitrogen, oxygen, and carbon monoxide which may be contained in the pyrolysis gas, and also minor proportions of acetylene, carbon dioxide, and ethylene. This gas may be used in several subsequent stripping steps, it may be used in the stripping of diacetylene in stripper 20, or it may be burned in the steam boilers.

The carbon dioxide and ethylene stripper 68 is preferably operated at or about atmospheric pressure. It is the function of this stripper to remove nearly all the carbon dioxide and ethylene that is absorbed in the dimethylformamide in the acetylene absorber without at the same time materially reducing the content of the acetylene absorbed therein. This is accomplished by utilizing, as the stripping gas, a gas containing sufficient acetylene so that the partial pressure of acetylene in the stripping gas approximates, or is greater than, the partial pressure of acetylene in the dimethylformamide stripper 68. Such a gas may be economically provided by passing such a quantity of the gas removed from the top of the acetylene absorber through the acetylene stripper 75, described below, as will furnish a gas with the proper partial pressure of acetylene. The gas passing through stripper 68 is passed through pipe 6 as recycle gas to the diacetylene absorber 2. The dimethylformamide is passed from stripper 68 by pipe 72, through heat exchanger 74, and by pipe 76 into the solvent rectifier 78. The rectifier 78 is comprised of rectifying section 78a, dephlegmator section 78b, and steam-heated boiler section 78c. The dimethylformamide is passed downwardly through the rectifying section 78a into boiler section 78c where it is boiled and degassed of acetylene. The acetylene moves up the rectifier section, through the water-cooled dephlegmator to condense out the dimethylformamide. The dimethylformamide flows from the bottom of section 78c through pipe 80, then through heat exchanger 74 and water-cooler 82 and into the main stream of dimethylformamide in pipes 84 and 64.

The acetylene, containing 1% to 4% of methylacetylene, passes from the top of the dephlegmator section 78b, through pipe 86 into the bottom of the methylacetylene absorber 88. Dimethylformamide is passed, through pipe 84, into the top of absorber 88. The flow of dimethylformamide is adjusted to remove nearly all (at least 90%) of the methylacetylene in absorber 88. About 40% to 60% of the acetylene content of the gas will also be absorbed by the dimethylformamide in the absorber. The remaining acetylene, substantially free from impurities (contains small amounts of carbon dioxide, ethylene, and methylacetylene, and traces of other impurities) is withdrawn from the top of absorber 88, through pipe 90, brine condenser 92, and pipe 94, as product acetylene. The acetylene product so produced is sufficiently pure for most commercial purposes; however, further purification by known means may be undertaken, if desired.

The dimethylformamide containing the methylacetylene and approximately half of the acetylene is passed through pipe 96, into the top of the acetylene stripper 75. As previously pointed out, the acetylene, and probably most of the methylacetylene, are stripped from the dimethylformamide by means of a relatively inert gas, very suitably with a portion of the gas passing from acetylene absorber 60. The quantity of stripping gas is adjusted to remove nearly all of the acetylene (at least 95%). Such an amount of stripping gas will remove about two-thirds of the methylacetylene. Sufficient methylacetylene should be retained in the dimethylformamide to prevent build-up of the methylacetylene in the system. The stripping gas is passed through pipes 61 and 98 into the bottom of stripper 75. The acetylene passing from the stripper is passed through pipe 100 in the bottom of the carbon dioxide and ethylene stripper 68.

The dimethylformamide, retaining about one-third of the methylacetylene, is passed through pipe 102 into the top of methylacetylene and monovinylacetylene stripper 104. The methylacetylene and monovinylacetylene are stripped from this dimethylformamide by passing through the same another portion of the gas removed from the acetylene absorber by means of pipe 106. The stripping gas is passed from stripper 104 through pipe 108 and water or brine condenser 110 to waste through pipe 120. The dimethylformamide condensed in condenser 110 is passed back to stripper 104 through pipe 112. The stripped dimethylformamide is passed from stripper 104 through pipe 114 back to the main stream of dimethylformamide.

Since all of the several streams of dimethylformamide are drawn from the main stream in pipe 64, a build-up of impurities such as high-boiling materials is prevented by the distillation of a portion thereof in still 36, as above stated.

The several absorbers and strippers may comprise sieve-plate or bubble-cap plate columns or packed towers. Still 36 and rectifier 78 are preferably sieve-plate or bubble-cap plate columns; however, the specific type of apparatus used is not critical to the process.

The operation of the system above described may be illustrated by the following example in which a crude pyrolysis gas of a given composition is continuously passed into the system for recovery of substantially pure acetylene.

The composition of the gases or solutions, as they pass through various parts of the system, as illustrated in the flow-sheet, is given below in mols per hour of the various constituents.

| Reference Numeral of System Part | 4 | 6 | 10 | 16 | 58 | 61 | 70 | 76 | 100 | 86 | 94 | 96 | 102 | 120 |
|---|---|---|---|---|---|---|---|---|---|---|---|---|---|---|
| Acetylene | 172 | 159 | 331 | 6.5 | 324 | 3.3 | 320.7 | 320.7 | 159 | 320.7 | 160 | 160.7 | 1.6 | 3.0 |
| Carbon Dioxide | 39 | 22 | 61 | | 61 | 40 | 21 | 0.8 | 1.9 | 0.8 | 0.8 | trace | | 17 |
| Propylene | 3 | 2.3 | 5.3 | | 5.3 | 3 | 2.3 | trace | 0.07 | trace | trace | | | |
| Ethylene | 54.4 | 9.6 | 64 | | 64 | 56.5 | 7.5 | 0.48 | 2.6 | 0.48 | 0.48 | trace | | 23.4 |
| Oxygen | 33.2 | 1.7 | 34.0 | | 34.9 | 34.9 | trace | trace | 1.7 | trace | trace | | | 14 |
| Hydrogen | 1,250 | 61.1 | 1,311 | | 1,311 | 1,311 | trace | trace | 61.1 | trace | trace | | | 540 |
| Carbon Monoxide | 127 | 6.2 | 1,332 | | 133.2 | 133.2 | trace | trace | 6.2 | trace | trace | | | 55 |
| Methane | 1,040 | 51 | 1,091 | | 1,091 | 1,091 | trace | trace | 51 | trace | trace | | | 450 |
| Nitrogen | 274 | 13.4 | 287.4 | | 287.4 | 287.4 | trace | trace | 13.4 | trace | trace | | | 118 |
| Monovinylacetylene | 2.7 | 0.4 | 3.1 | 0.5 | 2.6 | | 2.6 | 2.6 | 0.4 | 2.6 | | 2.6 | 2.2 | 2.2 |
| Divinylacetylene | 0.03 | | 0.03 | 0.03 | | | | | | | | | | |
| Diacetylene | 1.8 | | 1.8 | 1.8 | 0.0018 | | 0.0018 | 0.0018 | | 0.0018 | (1) | 0.0018 | | |
| Benzene | 12.4 | | 12.4 | 12.4 | | | | | | | | | | |
| Methylacetylene | 7.5 | 9.8 | 17.3 | 0.8 | 16.5 | | 16.5 | 16.5 | 9.8 | 16.5 | 0.17 | 16.3 | 7.5 | 7.5 |
| H₂O | 10.6 | | 10.6 | | 10.6 | 0.003 | 0.003 | 0.003 | | | | | | |
| Dimethylformamide | | | | 134 | | | 9,330 | 9,330 | | | | 2,060 | 2,060 | |
| Natural Gas | | | | | | | | | | | | | | |

[1] Under 10 p. p. m.

The process of this invention is exceptionally economical to operate, is comparatively simple by reason of the use of a single solvent, and will produce acetylene of good purity for commercial operation.

Since it is obvious that many changes and modifications can be made in the above-described details without departing from the nature and spirit of the invention, it is to be understood that the invention is not to be limited to said details except as set forth in the appended claims.

I claim:

1. The process of recovering acetylene from a crude gas obtained by the pyrolysis of a hydrocarbon which comprises passing said gas through a sufficient amount of dimethylformamide to remove any diacetylene but in insufficient amount to remove a substantial quantity of acetylene, passing said gas through a second quantity of dimethylformamide of sufficient amount to absorb nearly all of the acetylene from said gas, selectively stripping any ethylene or carbon dioxide from said second quantity of dimethylformamide, separating the remaining absorbed gas from said dimethylformamide, and passing such separated gas through a third quantity of dimethylformamide of sufficient amount to absorb nearly all of the methylacetylene therefrom and withdrawing, as product, the acetylene passing from said third quantity of dimethylformamide.

2. The process for the recovery of acetylene from dimethylformamide containing dissolved therein acetylene, carbon dioxide, ethylene, monovinylacetylene, and methylacetylene which comprises passing a gas from a subsequent acetylene stripping step through said dimethylformamide to selectively strip ethylene and carbon dioxide therefrom, separating the remaining absorbed gases from the dimethylformamide, passing said separated gases through such a second quantity of dimethylformamide as will absorb nearly all of the monovinylacetylene and methylacetylene and not to exceed 60% of the acetylene and withdrawing, as product, the substantially pure acetylene passing therethrough, stripping the remaining acetylene and a portion of the methylacetylene and monovinylacetylene from the dimethylformamide and passing such stripped gas to said ethylene and carbon dioxide stripping step.

3. A process for the recovery of acetylene from a gas containing acetylene, carbon dioxide, carbon monoxide, ethylene, monovinylacetylene, methylacetylene, hydrogen, and methane which comprises passing said gas through a sufficient quantity of dimethylformamide to absorb nearly all of the acetylene from said gas and thereby leaving a waste gas, passing a gas from a subsequent acetylene stripping step through said dimethylformamide to selectively strip ethylene and carbon dioxide therefrom, separating the remaining absorbed gases from said dimethylformamide, passing said separated gases through such a second quantity of dimethylformamide as will absorb nearly all of the monovinylacetylene and methylacetylene and not to exceed 60% of the acetylene, and withdrawing, as product, the substantially pure acetylene passing therethrough, stripping the remaining acetylene and a portion of the methylacetylene and monovinylacetylene from the second quantity of dimethylformamide by passing a portion of said waste gas therethrough and passing such stripped gas to said ethylene and carbon dioxide stripping step.

4. The process for the recovery of acetylene from dimethylformamide containing dissolved therein acetylene, carbon dioxide, ethylene, monovinylacetylene, and methylacetylene which comprises passing a gas from a subsequent acetylene stripping step through said dimethylformamide to selectively strip ethylene and carbon dioxide therefrom, separating the remaining absorbed gases from the dimethylformamide, passing said separated gases through such a second quantity of dimethylformamide as will absorb nearly all of the monovinylacetylene and methylacetylene and not to exceed 60% of the acetylene, and withdrawing, as product, the substantially pure acetylene passing therethrough, stripping the remaining acetylene and a portion of the methylacetylene and monovinylacetylene from the dimethylformamide and passing such stripped gas to said ethylene and carbon dioxide stripping step, passing a gas through said second quantity of dimethylformamide to remove nearly all of the remaining methylacetylene and monovinylacetylene therefrom and recovering said dimethylformamide.

5. A process for the recovery of acetylene from a gas containing acetylene, carbon dioxide, carbon monoxide, ethylene, monovinylacetylene, methylacetylene, hydrogen, and methane which comprises passing said gas through a sufficient quantity of dimethylformamide to absorb nearly all of the acetylene from said gas and thereby leaving a waste gas, passing a gas from a subsequent acetylene stripping step through said dimethylformamide to selectively strip ethylene and carbon dioxide therefrom, separating the remaining absorbed gases from said dimethylformamide, passing said separated gases through such a second quantity of dimethylformamide as will absorb nearly all of the monovinylacetylene and methylacetylene and not to exceed 60% of the acetylene, and withdrawing, as product, the substantially pure acetylene passing therethrough, stripping the remaining acetylene and a portion of the methylacetylene and monovinylacetylene from the second quantity of dimethylformamide by passing such a portion of said waste gas therethrough that the methylacetylene stripped from said second quantity of dimethylformamide will approximate two-thirds of the amount of methylacetylene contained therein, and passing such stripped gas to said ethylene and carbon dioxide stripping step.

References Cited in the file of this patent

UNITED STATES PATENTS

| | | |
|---|---|---|
| 2,146,448 | Scott et al. | Feb. 7, 1939 |
| 2,217,429 | Balcar | Oct. 8, 1940 |